United States Patent Office 3,182,790
Patented May 11, 1965

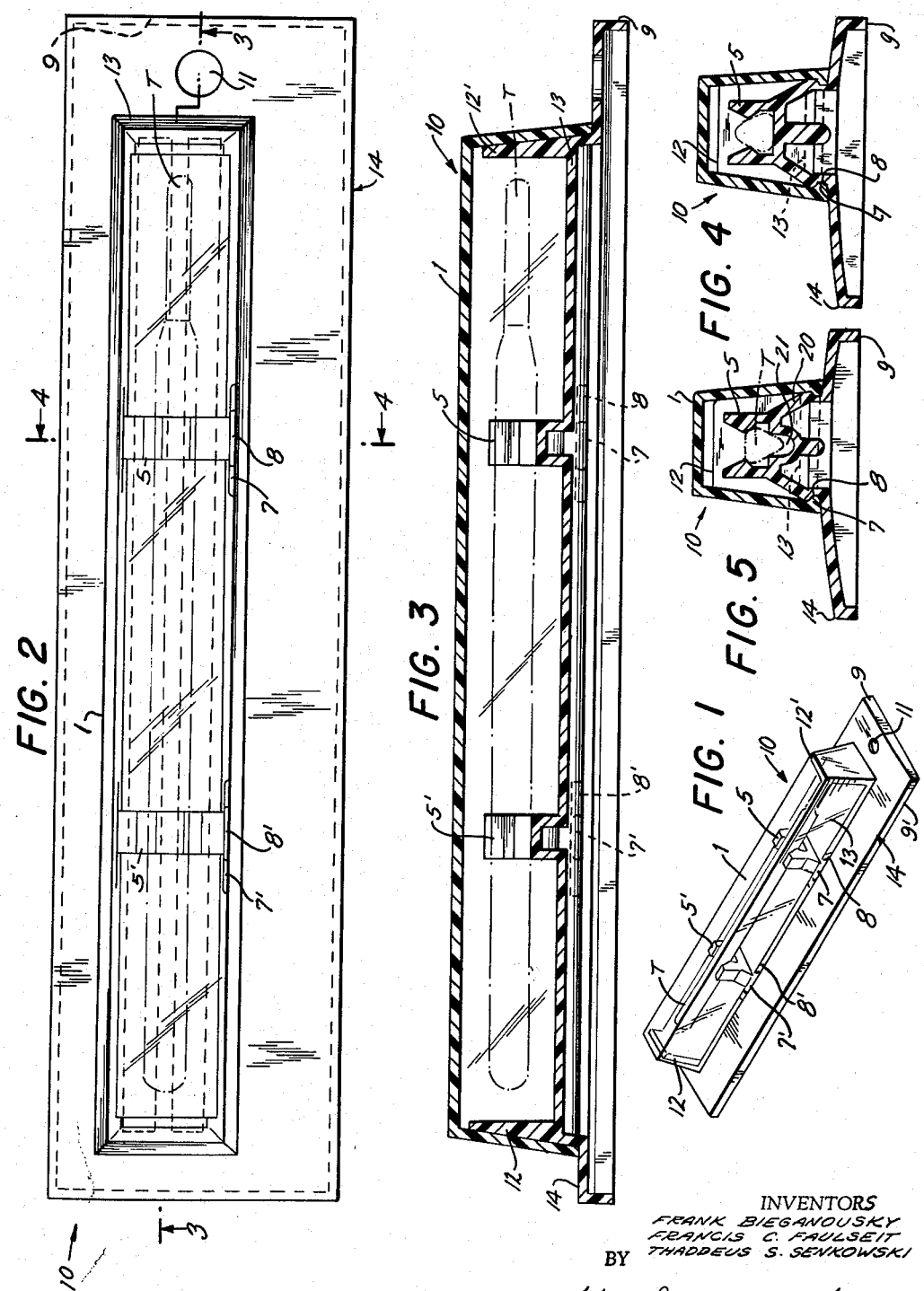

3,182,790
THERMOMETER CASE
Frank Bieganousky, Pompton Lakes, Francis C. Faulseit, Clifton, and Thaddeus S. Senkowski, Cedar Grove, N.J., assignors to Becton, Dickinson and Company, East Rutherford, N.J., a corporation of New Jersey
Filed Nov. 1, 1963, Ser. No. 320,806
2 Claims. (Cl. 206—45.19)

This invention relates to an improved case for holding a thermometer and more particularly to an improved sheltering case for holding a clinical thermometer.

The shielding and storing of thermometers is of particular importance to the medical instruments industry. Conventional cases, such as the fountain pen type, do not provide adequate protection for thermometers as upon the dropping thereof the thermometer invariably breaks. In addition, such cases tend to roll and if not carefully placed away frequently roll off a surface (such as a shelf in a medicine cabinet) and topple to the floor causing breakage of the thermometer. Box type cases have also heretofore presented many problems. Side walls appearing on the base portion of such cases make access to the thermometer at best irksome. The flip-open box type case does not provide any solution as the removal of the thermometer is also beset with problems in that the release of the thermometer and case at the same time is cumbersome, and often results in breakage of the thermometer since the thermometer might be totally released therefrom and fall if not quickly held.

It is an object of the present invention to overcome the abovementioned difficulties and to provide an improved thermometer case having a bottom portion without side walls, and which does not allow for the releasing of the thermometer upon dropping or bending of said bottom portion. Another object of my invention is to provide an improved thermometer case with a transparent top portion so that the presence of the thermometer therein can be readily determined. Further, the thermometer will be firmly but releasably suspended in resilient snap-holding devices within the case, protecting the thermometer from shock if the case is dropped, thus preventing breakage or bore fracture. The thermometer remains suspended therein and is not released by the shock or bending of the bottom portion upon impact thereof. A further object is to provide an improved thermometer case that will not roll.

Our invention contemplates overcoming the difficulties heretofore encountered by providing an improved thermometer case for holding a clinical thermometer comprising a supporting base member having a display platform on its outer surface upon which is integrally mounted a plurality of resilient clips in aligned longitudinally spaced relationship to engage and support a clinical thermometer in spaced relationship from the platform. A complementary transparent cover member is provided, said cover member being removably engageable with the base member. The base member is absent any side walls, thus making for ready access to the thermometer.

For a more complete understanding of our invention reference should be made to the accompanying drawings in which:

FIG. 1 is a perspective view of the improved thermometer case assembly showing the cover member assembled thereon and including the thermometer engaged and supported by the resilient clips therein;

FIG. 2 is a top plan view showing the thermometer case embodying our invention;

FIG. 3 is a longitudinal sectional view in side elevation in the direction of the arrows on the line 3—3 of FIG. 2;

FIG. 4 is a transverse sectional view along the arrows on the line 4—4 of FIG. 2; and FIG. 5 is a transverse sectional view similar to FIG. 4 showing a modified and preferred embodiment of the invention.

Referring primarily to FIG. 3 the numeral 10 indicates the complete assembly. The supporting base member 14 has a transversely convex outer surface (FIG. 4) with an elongated display platform 13 outwardly offset from said outer surface and integrally connected thereto by side and end edges. It has rearwardly extending flanges 9, 9' around its edges. The supporting base member 14 is preferably opaque and is preferably made of a resilient plastic material such as polypropylene, polyethylene or plasticized polyvinyl chloride.

Appearing on the display platform and connecting integrally therewith in aligned longitudinally spaced relationship are a plurality of resilient clips 5, 5' which releasably engage and support a clinical thermometer T. These snap-holding devices will take the thermometer in any relative rotational position and release thereof may be accomplished by simply grasping the thermometer between one's fingers. The resilient clips are formed of uprights or standards projecting outwardly from the platform and terminating in confronting resilient gripping jaws.

A complementary cover 1 is provided. The cover is preferably transparent and is preferably made of a more rigid plastic material than the base member 14 such as polystyrene, methyl methacrylate resin and rigid polyvinyl chloride. Thus the case may be readily inspected to ascertain if the thermometer is present therein. The cover 1 is comprised of a top portion and downwardly diverging side and end walls of a size and shape to fit over and engage the side and end edges of the platform 13. Inwardly projecting detents 7, 7' formed adjacent the outer edges of the side walls of the cover that are releasably interengageable with complementary detents 8, 8' appearing in the edges of the platform may be used to releasably secure said cover member to the base member.

The platform 13 is further provided with outwardly projecting flanges 12, 12' which are tapered in width and are disposed at angles slanting toward each other at opposite ends of said platform to help guide and support the cover member.

In the preferred form of our invention as shown in FIG. 5 we have provided the base portions 20 of the resilient clips 5, 5' with a downwardly extending recess 21 which allows for the accommodation of the thermometer in any position by the clips. For example, if the thermometer is inserted with the apex in a downward position it will be supported in said recesses with substantially no upward moment of force tending to release the thermometer from the assembly. The thermometer will remain in position and will not be dislodged when the base portion is flexed or if the thermometer case is dropped.

Removal of the thermometer is accomplished by simply grasping it between one's fingers and pulling it outwardly from the clips after removal of the cover member. Insertion of the thermometer is accomplished by aligning it with the outer ends of the clips and then pressing it into engagement with the jaws. There are no side walls surrounding the thermometer thus access thereto is easy and efficient. In addition, the thermometer will not jar loose if the case should be dropped nor will it spring free should the base member be flexed. The case may be stored on any horizontal surface or is desired by suspension thereof on a vertical surface by suitable suspending means such as aperture 11 (FIG. 1) provided adjacent one end of the base member.

Modifications may be made in the illustrated and described embodiment of our invention without departing from the scope of the invention set forth in the accompanying claims.

We claim:

1. An improved clinical thermometer and casing assembly comprising an elongated clinical thermometer made of a frangible material and a case for protecting and displaying the thermometer including a supporting base member made in one piece of a relatively flexible resilient opaque plastic material and a complementary cover made in one piece of a relatively more rigid transparent plastic material, and removably engageable with the base member to form an enclosed case, said base member having a transversely convex outer surface with an elongated display platform outwardly offset from the outer surface at an intermediate portion and integrally connected thereto by side and end edges disposed at a steep angle to the platform, and being formed with outwardly projecting guide and supporting flanges, tapered in width and disposed at angles slanting toward each other at opposite ends of the platform to engage and help guide and support the cover member, and said base member also having a plurality of resilent clips mounted on said platform in longitudinally spaced relationship, each clip having a base portion and a pair of clamping jaws spaced outwardly from the platform, said clips having a clamping zone between the jaws and being arranged with the clamping zones in longitudinal alignment with the clamping jaws positioned on opposite sides of the axis of alignment, said clips engaging and supporting said clinical thermometer in spaced relationship from the platform so that it can be readily grasped between the fingers for removal and insertion, and said cover member having a top portion and outwardly flared integral side and end walls engaging the guide and supporting flanges and side edges of the platform.

2. An improved clinical thermometer and casing assembly as set forth in claim 1 in which the thermometer is triangular in cross-section and in which the base portion of each of the resilient clips is provided with a downwardly extending recess to accommodate the apices of the triangular configuration.

References Cited by the Examiner
UNITED STATES PATENTS

| 690,864 | 1/02 | Louder | 206—45.14 |
| 3,045,812 | 7/12 | Randolph | 206—45.19 X |
| 2,636,600 | 4/53 | Denton et al. | 206—45.19 X |
| 2,645,334 | 7/53 | Aldridge | 206—45.34 X |

THERON E. CONDON, *Primary Examiner.*

GEORGE O. RALSTON, *Examiner.*